Figure 1:
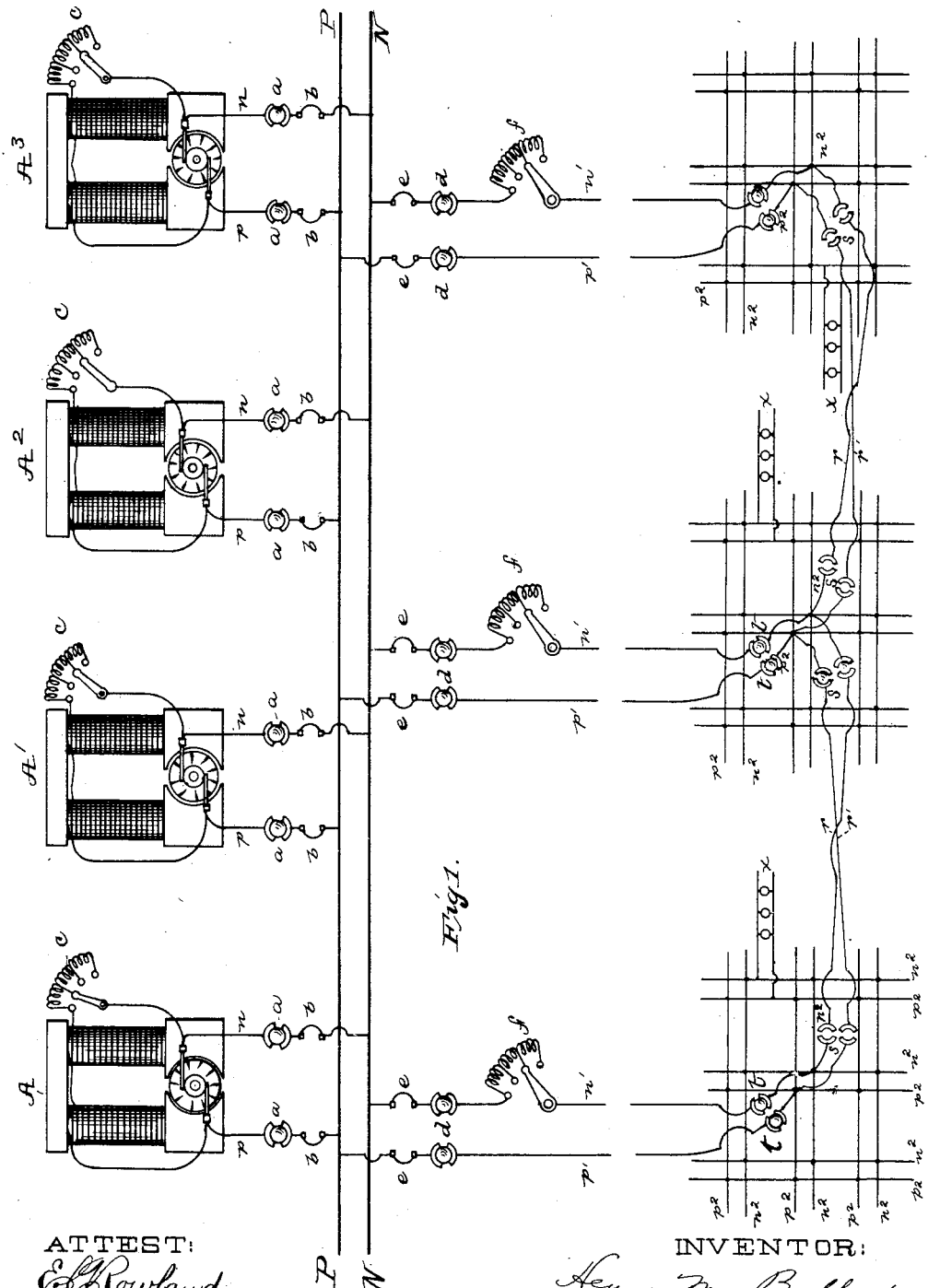

(No Model.) 2 Sheets—Sheet 1.

H. M. BYLLESBY.
SYSTEM OF ELECTRICAL DISTRIBUTION.

No. 329,621. Patented Nov. 3, 1885.

ATTEST:
E. C. Rowland
Paul D. Dyer

INVENTOR:
Henry M. Byllesby,
By Dyer & Seely
Attys

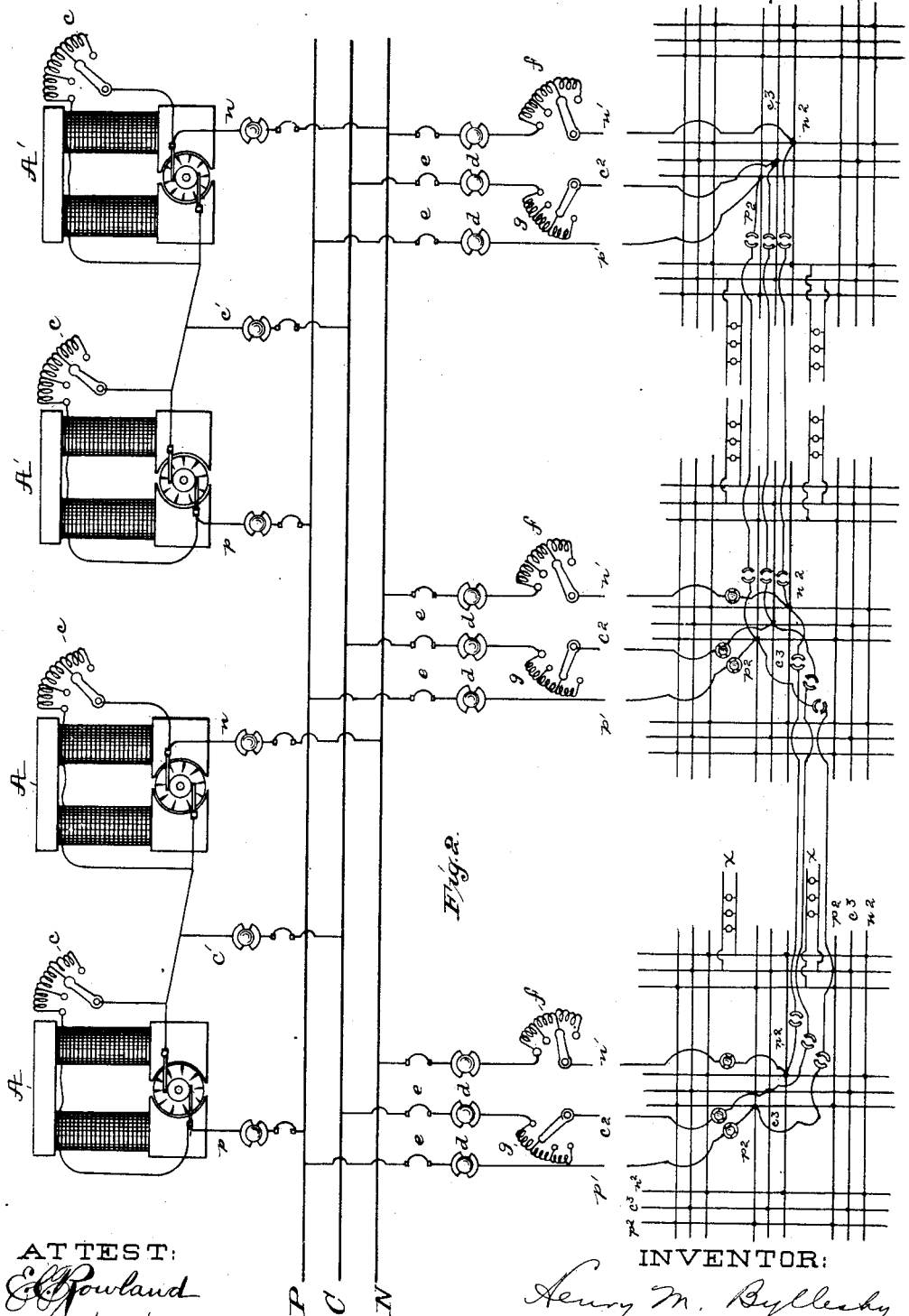

UNITED STATES PATENT OFFICE.

HENRY M. BYLLESBY, OF NEW YORK, N. Y.

SYSTEM OF ELECTRICAL DISTRIBUTION.

SPECIFICATION forming part of Letters Patent No. 329,621, dated November 3, 1885.

Application filed October 10, 1884. Serial No. 145,137. (No model.)

*To all whom it may concern:*

Be it known that I, HENRY M. BYLLESBY, of New York, in the county of New York and State of New York, have invented a certain new and useful Improvement in Systems of Electrical Distribution, of which the following is a specification.

My invention relates to systems for the general distribution of electricity for light, power, and other purposes. Usually in such systems the generators at the central station or source of supply have all been connected to two main conductors, from which conductors feeding-circuits extend to a system of intersecting and connected positive and negative main conductors. In this arrangement difficulty arises from the mutual dependence upon one another of all the feeding-circuits, they being connected together at both ends through the "omnibus-wires" at the central station, and through the system of main lighting-conductors in the district. For instance, when a cross occurs in one part of the district, causing an excess of current on the feeder nearest thereto, so as to burn out the safety-catch in that feeder, this current is all thrown upon the next feeder, and so overloads it as to destroy its safety-catch, and this will continue throughout the system until all the feeder safety-catches are destroyed and the supply of current ceases throughout the entire system. It has been proposed, in order to remedy this, to do away with the common main conductors at the central station, and connect each generator separately with the feeders, so that such feeders are connected together only through the lighting-conductors, and are thereby made independent and separately controllable; but in this system the advantages of using the omnibus-wires are lost. When such wires are used, the difference of potential is the same at the station-terminals of all the feeders, each feeder being supplied by all the generators, while if they are not used the feeders, being separately connected with the generators, may each be supplied at a different electro-motive force, each generator having its own regulator. Further, by means of the omnibus-wires the whole current supplied to the district is most readily varied, as any change in the generation of current by any machine affects the whole system, and the generators may be readily thrown on and off, to increase or diminish the current supplied.

In the system which forms my invention I am enabled to combine the advantages of the independently-controlled feeders with those of common central-station conductors. Such system consists of one or more generators connected to the two main conductors at the station, and two or more feeding-circuits extending from said main conductors, each of said feeding-circuits being connected with a separate section of the lighting-conductors—that is to say, the intersecting and connected positive and negative conductors from which the house-circuits extend, instead of being all connected together throughout the district, are electrically divided into sections, each section being supplied by a separate feeding-circuit. I prefer to provide each feeding-circuit with a circuit making and breaking switch, a safety-catch, and an adjustable resistance or other suitable regulating device. Any feeder may therefore be disconnected from the system without affecting the current in any other feeder to any material extent, the generator being regulated to maintain a constant electro-motive force, or the current of any feeder may be varied without changing that of the others. At the same time, the generators all feeding into the same main conductors, there is the same initial electro-motive force for all the feeders. The field-circuit of each generator is provided with an adjustable resistance for regulating its electro-motive force, whereby a constant electro-motive force is maintained, or the determined constant electro-motive force may be raised or lowered, if necessary, to regulate the current for the entire system; or these effects may in some cases be produced by connecting or disconnecting one or more generators from the common main conductors.

My invention is applicable, further, to the three-wire or compensating system of electrical distribution, as will be presently set forth. I may, in addition, provide the system with means for connecting together the sections of lighting-conductors, if at any time it should be desired, by reason of a cross or leak in the feeding-circuit supplying a section, or for any other reason, to supply two or more sections from the same feeder. Normally such connections are open, and they are only closed under circumstances such as I have just mentioned.

The invention may be more readily understood by reference to the accompanying drawings, in which—

Figure 1 is a diagram representing a two-wire system, and Fig. 2 a diagram of a three-wire system, both embodying the said invention.

A A', &c., are electrical generators. Referring first to Fig. 1, these generators are all connected in multiple arc with two main conductors, P and N, by wires $p$ $n$. Each of said wires $p$ $n$ contains a switch, $a$, for throwing the machine on and off, and a fusible-wire safety-catch, $b$, for breaking the circuit on an excess of current. The field-circuit of each machine contains an adjustable resistance, $c$, for regulating the electro-motive force. While, for convenience, these resistances are shown as independently adjustable, it is usually preferred to arrange them for simultaneous adjustment, as in the patent of T. A. Edison, No. 281,349, dated July 17, 1883. From the central station main conductors P N extend the feeding-circuits composed of conductors $p'$ $n'$. Each feeding-conductor has break-circuit switch $d$ and safety-catch $e$, and each feeding-circuit contains a regulating-resistance, $f$. Each feeding-circuit extends to a certain point in the district supplied from the station, where it is connected with the positive and negative lighting-conductors $p^2$ $n^2$. These conductors are connected together, positive to positive and negative to negative, at the street-corners, where they intersect one another, as has heretofore been customary; but, instead of being all connected throughout the district, they are divided into sections, as illustrated, one feeding-circuit extending to each section. The sections may be of any convenient area, each comprising such suitable number of translating devices as can be conveniently supplied by a single feeding-circuit, and the divisions may be made at convenient points. Electric lamps or other translating devices, $x$ $x$, are connected in multiple arc with the conductors $p^2$ $n^2$. Each feeder having its own regulating device $f$, the current in each is regulated according to the amount required in its section at any time; and it is evident that such regulation will not affect the other feeders, a constant electro-motive force being maintained, as has been already pointed out; but by means of conductors P N the same initial pressure is maintained at the station for all the feeders. If a safety-catch is burned out on one feeder, that section is cut out, but there is no increase in current on the other feeders. At the same time the total current supplied to the district is readily varied by means of the field-resistances, or by changing the number of generators in connection with the system.

The feeding-conductors are broken away in the drawings between the central station and the lighting-conductors to indicate that there may be a considerable intervening distance.

As above stated, I may provide means for temporarily connecting the sections at any time. Such means preferably consist of conductors $r$ $r'$, which I term "relief-wires," each provided with a plug-switch, $s$, or other suitable circuit-controlling device. These wires connect the terminals of the feeder of each section with those of the sections contiguous to it. They are normally open at $s$ $s$; but if a cross or ground or other defect should arise in any feeder the circuit $r$ $r'$, connecting it with the next section, is closed, and the feeder of said next section will therefore supply both sections with current. Both conductors of the defective feeder should previously be broken at $t$ $t$, these switches being situated close to the feeder-terminals, so that the cross or leak can not affect the system. Circuits $r$ $r'$ may be closed to several neighboring sections, if more current is required than one feeder can supply. It will be understood, however, that normally the circuits $r$ $r'$ are all open and feeding-circuits all closed, the sections being connected together only for the relief of the system in the event of such difficulties occurring as have been set forth.

In Fig. 2 there are three common main conductors, P, N, and C, the middle one, C, being the compensating-conductor. The generators are in series of two each, A A and A' A', the compensating-conductor being connected between the generators of each group by conductor $c'$. The generators are provided each with a regulating-resistance, $c$, as shown; or the field-coils of each group may be in series and have a common resistance. Switches and safety-catches are provided for conductors $p$ $c'$ $n$. The feeding-circuits also consist each of three conductors, $p'$ $c^2$ $n'$, and these are connected, as shown, to the lighting-conductors $p^2$ $c^3$ $n^2$. The feeding-conductors have switches and safety-catches, as before, and an additional adjustable resistance, $g$, is placed in the compensating-conductor, to be used if one main conductor is thrown off, so that the compensating-conductor forms one side of the circuit. The lamps or other translating devices are in multiple series, as shown. The lighting-conductors are divided into sections, to each of which a feeder is connected, as in Fig. 1, and the effect is the same. In this case also the system is provided with relief-conductors $r$ $r'$ $r^2$, each having a switch, $s$, so that the sections may be connected together, if necessary, as above described.

What I claim is—

1. A system of electrical distribution comprising one or more generators, main conductors to which said generators are connected, a system of lighting-conductors divided electrically into sections, two or more feeding-circuits extending from said main conductors, one to each of said sections, and circuit-controlling devices for each feeding-circuit, substantially as set forth.

2. A system of electrical distribution comprising one or more generators, main conductors to which said generators are connected, a system of lighting-conductors divided electrically into sections, two or more feeding-circuits, one extending from said main conductors to each of the sections of the lighting-conductors, and adjustable resistances for the feeding-circuits, substantially as set forth.

3. A system of electrical distribution comprising one or more generators, main conductors to which said generators are connected, a system of lighting-conductors divided electrically into sections, two or more feeding-circuits extending from said main conductors, one to each of said sections, and means for temporarily connecting together any two of the sections, substantially as set forth.

4. A system of electrical distribution comprising one or more generators, main conductors to which such generators are connected, a system of lighting-conductors divided electrically into sections, two or more feeding-circuits extending from said main conductors, one to each of said sections, two or more relief-conductors connecting said sections together, a circuit making and breaking switch for each of said relief-conductors, and a circuit making and breaking switch for each conductor of each feeding-circuit, substantially as set forth.

This specification signed and witnessed this 8th day of October, 1884.

HENRY M. BYLLESBY.

Witnesses:
WM. H. MEADOWCROFT,
THOS. G. GREENE, Jr.